J. D. BUTLER.
Car Truck.
No. 42,556.
2 Sheets—Sheet 1
Patented May 3, 1864.
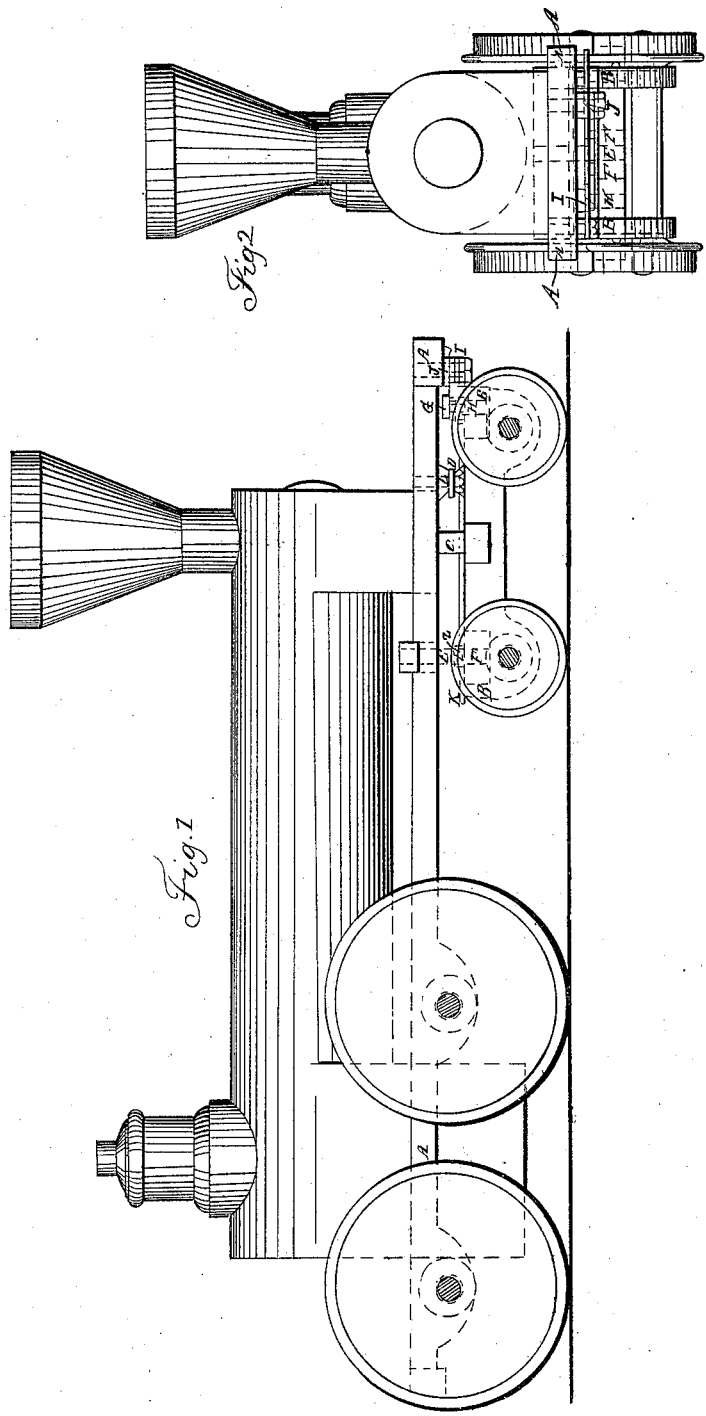

J. D. BUTLER.
Car Truck.
No. 42,556.
2 Sheets—Sheet 2
Patented May 3, 1864.
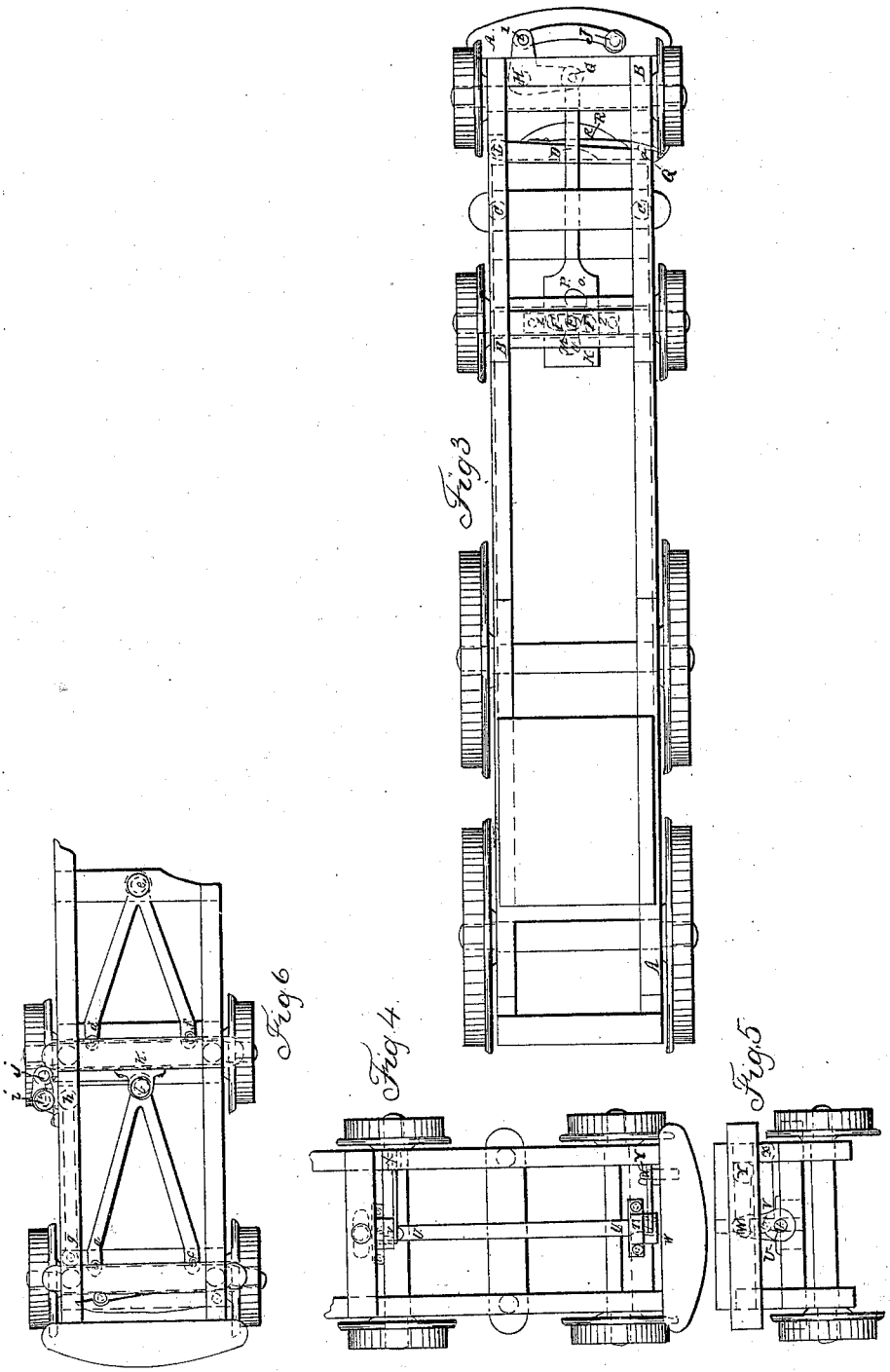

UNITED STATES PATENT OFFICE.

JAMES D. BUTLER, OF BROOKLYN, NEW YORK.

IMPROVEMENT IN LOCOMOTIVE-TRUCKS.

Specification forming part of Letters Patent No. 42,556, dated May 3, 1864.

*To all whom it may concern:*

Be it known that I, JAMES D. BUTLER, of Brooklyn, in the county of Kings and State of New York, have invented a new and Improved Arrangement of Locomotive Truck and Main Frame Connections; and I do hereby declare that the following is a full, clear, and exact description thereof, reference being had to the annexed drawings, making a part of this specification.

It is well known that the proper line of direction of the main frame of a locomotive with reference to the track is determined by the driving-wheels, whose axle-bearings are fixed in this frame, and that upon a curved track this line of direction can be taken freely only through a properly-regulated transverse motion of the truck frame or frames under the main frame. To secure by a convenient arrangement such transverse motion in running upon a curve and increased steadiness upon a straight track is the object of my invention.

In the annexed drawings, Figures 1, 2, and 3 represent the side, end, and bottom views, respectively, of one form of the invention. Figs. 4 and 5 represent the top and end views, respectively, of another form. Fig. 6 represents a top view of another form.

In the Figs. 1, 2, and 3, A A represent the main engine-frame, and B B the truck-frame, both of which are of the ordinary form.

The weight of the engine may be taken upon the truck through the legs C C of the main frame, which slide freely upon the truck-frame, or through segments or rollers interposed between the two frames, or in any of the many obvious ways, as may be preferred.

The pin E is fastened to the main frame and works in the slot F F in the truck-frame. The bell-crank G H I turns upon the truck-frame about the pin H. The end I of one of its arms is connected with the pin J on the main frame of the engine by the link I J. The end G of the other arm is attached to a bar, K G, which has a slot, M N O P, inclosing the pin E. The slotted part of the bar is guided by the blocks Z Z, fastened to the truck-frame.

The operation of the arrangement is as follows: When the engine runs from a straight upon a curved track, the first action is to give the forward end of the truck a transverse motion under the main engine-frame. This motion produces through the link I J an angular movement of the bell-crank G H I about its center H, and through it a motion in the direction of its length of the bar K G. Now, as this bar is thus moved it brings a different part of the slot M N O P opposite to the pin E, and thus permits this part of the truck to take a transverse motion upon the pin and the main frame, to which the pin is fastened. This transverse motion corresponds to that of the forward end of the truck, already noticed, upon which it obviously depends.

The shape of the slot M N O P may be varied at pleasure to secure whatever relations may be desired between the transverse motions of the two points in the truck from which the attachments to the main frame are made.

The bar D swings upon the pin I on the main frame. It has on it a notch, represented as caught upon the pin Q in the truck-frame. The notch and pin are so shaped that when any pressure is exerted between them in the direction of the length of the bar they tend to slide up the side of and clear from each other. The spring R resists this tendency to a greater or less degree, acting to keep them together. When this notch in the bar is caught upon the pin Q, there is formed between the main and truck frames a connection which is sufficiently strong to meet fully the tendency to motion between them as occasioned by little irregularities in the track, but which yields, through the uncatching of the notch and pin Q, to the more decided pressure which is exerted when the engine runs upon a curve.

The pin J on the main frame may pass through the end I of the bell-crank arm H I, instead of being connected with it by the link I J, as shown in the drawings. In this case the relative positions of the main and truck frame in the direction of their length will be determined by the arm H I, instead of by the pin E and slot F F.

In Figs. 4 and 5, S and T represent boxes on the truck-frame, in which the shaft U U turns. The arms V W are fastened upon this shaft. The end of V is connected with the main frame by the link V X and pin X, and that of W by W Y and Y. The relative transverse motions of the points S and T of the truck with reference to the main frame are determined by the comparative lengths of the arms V and W.

In Fig. 6 are shown two truck-frames, $a\,b\,c$ and $d\,e\,f$, of the form used in what is known as the "Bissel truck." They swing upon the pins $b$ and $e$, respectively, which are fixed in the main frame. The bell crank $h\,i\,j$ turns about the pin $i$ on the main frame. The extremity $h$ of one of its arms is connected with the pin $g$ on the forward truck-frame by the link $g\,h$. The end $j$ of its other arm is connected with the pin $k$ on the after truck-frame by the link $j\,k$.

The transverse motion of the forward end of the forward truck involves (being about a center) a movement of the point $g$ such as shall act, through the link $g\,h$, the bell-crank $h\,i\,j$, and the link $j\,k$, to produce a transverse movement between the after truck and main frames corresponding to that between the forward-truck and main frames.

When two truck-frames are used, each, instead of swinging about a fixed center on the main frame, may have different transverse motions given to two points upon it, or may move transversely on guides in the main frame.

Each of the above-described arrrangements consists of two connections between the main and truck frames, acting in combination with each other. In the form represented in Figs. 1, 2, and 3 the connections are that composed of the pin J, the link J I, the pin I, the arm I H, and the pin H, which may be designated as the connection J I H, and that of the pin L, the slotted head K of the bar K G, and the guide-blocks Z Z, designated as the connection E K Z. Their combination is through the arm G H, the pin G, and the extension of the bar K G.

In Figs. 4 and 5 the connections are that formed of the pin X, the link V X, the pin V, the arm V, the shaft U U, and the box $s$, and that of the pin Y, the link W Y, the pin W, the arm W, the shaft U U, and the box T. Their combination is by fastening the arms V and W to the same shaft U U.

In Fig. 6 the connections are that composed of the pin $g$, the link $g\,h$, the pin $h$, the arm $h\,i$, and the pin $i$, and that of the pin $i$, the arm $i\,j$, the pin $j$, the link $j\,k$, and the pin $k$. Their combination is through the bell-crank $h\,i\,j$.

It is necessary that the connections be so arranged as to require a difference between any simultaneous transverse motions under the main frame of the forward and after truck-wheels, respectively. This difference in any particular case will be determined by the direct action of the track upon the truck-wheels, depending upon the line of the track. In running upon a straight line there will not be different, and therefore cannot be any, transverse motions of the truck-wheels with reference to the main frame. In striking upon a curve, however, different transverse motions of these wheels are involved, the extent of which will be determined by the difference between them, or, in other words, by the direct action of the track upon these truck-wheels. Now, the connections between the main and truck frames may be so adjusted and combined that these entire transverse motions shall always be such as are required to give the proper line of direction to the main frame, as indicated by the action of the curve upon the driving-wheels. This control of the entire transverses motions of the truck-wheels under the main frame by the difference between these motions, as determined in any case by the action of the track upon these wheels, is secured not by the simple connections between the main and truck frames, but by the combining of these connections with each other.

It is evident that a locomotive conforming to the line of the track as above described will run upon a curve with much greater ease of motion and freedom from strain than one in which there shall be either no transverse movement between the main and truck frames, or only such as shall have no definite relation to the line of the track except as the control of the direction of the main frame shall be thrown altogether upon the driving-wheels.

My invention is not confined to the particular arrangements which have been described in detail. There is an almost endless variety of forms which the connections themselves may take, each of which is really equivalent to those of J I H and E K Z, Figs. 1, 2, and 3, thus the connections may be composed of a nut and screw, or a cam and its attachments, or a rack and pinion, or gears working together, or a chain passing over pulleys or wound upon a drum, &c., through the proper use of any of which forms the same positive control of the transverse motions is secured as by the employment of J I H and E K Z.

Now, I do not claim the connections themselves as my invention, but the combining of them with each other, which must be effected by devices necessarily depending upon and changing with the particular form of connections used. My invention covers the combining with each other, substantially as described, of whatever connections are employed equivalent, as above explained, to J I H and E K Z. The advantages secured by it, without reference to the exact details of form and construction, have been already set forth.

I am not limited to the use of two connections between the main and truck frames, for though they are sufficient when properly applied, yet, more evidently, may be used if desired.

I do not claim the connections J I H and E K Z, or their equivalents; but

What I claim as my invention, and desire to secure by Letters Patent, is—

1. Combining two or more connections, J I H and E K Z, or their equivalents, between the main and truck frames of a locomotive, substantially as described.

2. The combination, with the notched bar D, or its equivalent, of the pins L and Q and the spring R, or their equivalents, substantially as described.

JAMES D. BUTLER.

Witnesses:
F. R. HICKS,
FRANCIS WOOD.